(12) United States Patent
Gorelik

(10) Patent No.: US 8,898,194 B2
(45) Date of Patent: Nov. 25, 2014

(54) SEARCHING AND DISPLAYING DATA OBJECTS RESIDING IN DATA MANAGEMENT SYSTEMS

(75) Inventor: Alexander Gorelik, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 13/616,803

(22) Filed: Sep. 14, 2012

(65) Prior Publication Data

US 2013/0013590 A1  Jan. 10, 2013

Related U.S. Application Data

(63) Continuation of application No. 13/029,454, filed on Feb. 17, 2011, now Pat. No. 8,380,750.

(51) Int. Cl.
*G06F 17/30* (2006.01)
(52) U.S. Cl.
CPC .............................. *G06F 17/30554* (2013.01)
USPC ............ 707/791; 707/802; 707/822; 707/600
(58) Field of Classification Search
CPC ...................................................... G06F 17/30
USPC ................................................. 707/600–899
See application file for complete search history.

(56) References Cited

U.S. PATENT DOCUMENTS

| | | | |
|---|---|---|---|
| 7,158,971 B1 | 1/2007 | Bascom | |
| 7,426,520 B2 | 9/2008 | Gorelik et al. | |
| 7,680,828 B2 | 3/2010 | Gorelik et al. | |
| 2002/0091679 A1 | 7/2002 | Wright | |
| 2002/0099536 A1 | 7/2002 | Bordner et al. | |
| 2007/0073748 A1 | 3/2007 | Barney | |
| 2009/0083676 A1* | 3/2009 | Flanagan et al. | 715/853 |
| 2010/0223247 A1 | 9/2010 | Wurzer | |

* cited by examiner

*Primary Examiner* — Isaac M Woo
(74) *Attorney, Agent, or Firm* — Joe Polimeni; Edell, Shapiro & Finnan, LLC

(57) ABSTRACT

A data source is accessed to provide information. The data source is accessed by defining a plurality of data objects each associated with data within the data source, where the data objects include search information that facilitates searching of the data objects, and the data objects further include display information that pertains to a format in which data obtained from a search of the data objects is displayed, defining one or more relationships linking at least one data object with at least one other data object so as to establish associated data objects with linking relationships, receiving a query to search for data within the data source, retrieving data within the data source satisfying the query in accordance with the search information, where the retrieved data comprises data from at least two associated data objects, organizing and displaying the retrieved data in accordance with the display information, and displaying one or more links associated with the retrieved data so as to enable navigation between associated data objects.

17 Claims, 9 Drawing Sheets

Customers — 402

| Company | Street Address | State | Country | Contact | Account Manager | Reports |
|---|---|---|---|---|---|---|
| ABCD | 123 ABC Street | TX | USA | Andy Fastow | Franz Meyer | EOY Loan Principle, EOQ Loan Principle |
| ABCD | 456 XYZ Street | TX | USA | Kerry Blue | Bob Jones | EOY Loan Principle, EOQ Loan Principle |

Loans — 404

| Loan # | Company | Contact | Origination Date | Remaining Principal | Reports |
|---|---|---|---|---|---|
| 39594A | ABCD | Andy Fastow | 3-Feb-2000 | $125,000,000 | EOY Loan Principle, EOQ Loan Principle |
| 53269B | ABCD | Kerry Blue | 15-Jan-2000 | $85,000,000 | EOY Loan Principle, EOQ Loan Principle |
| 98991B | ABCD | Andy Fastow | 15-Dec-2000 | $93,000,000 | EOY Loan Principle, EOQ Loan Principle |
| 776552 | ABCD | Andy Fastow | 11-Oct-2000 | $20,000,000 | EOY Loan Principle, EOQ Loan Principle |
| 87765A | ABCD | Kerry Blue | 5-Jun-2000 | $180,000,000 | EOY Loan Principle, EOQ Loan Principle |

Purchase Orders — 406

| PO # | Company | Contact | Origination Date | Value | Description |
|---|---|---|---|---|---|
| 39594A | Acme Oil Tankers | Andy Fastow | 3-May-2000 | $250,000,000 | Oil Tanker purchased on behalf of ABCD |

| Company | Type | Street Address | City | State | Country | Account Manager | Related Lists | Contacts | | | | | Reports and Analytics |
|---|---|---|---|---|---|---|---|---|---|---|---|---|---|
| | | | | | | | | Contact | Title | Telephone | Email | | |
| ABCD | Premier | 123 ABC Street | Houston | TX | USA | Franz Meyer | Orders | Andrew Faustow | CFO | 999-111-1234 | af@abcd.com | | Profitability Risk Analysis |
| | | | | | | | | Kerry Blue | GM, Gas | 212-345-5678 | hotgas@abcd.com | | |

604

| Order Number | Status | Date | Amount | Customer | Line Items | | | | Reports and Analytics |
|---|---|---|---|---|---|---|---|---|---|
| | | | | | Product | Quantity | Price | Commission | |
| 125 | Closed | 7/1/97 | 100,000,000 | ABCD (Premier) | Tanker | 1 | 100,000,000 | 7,000,000 | ... |
| 871 | Cancelled | 12/12/98 | $18,900 | ABCD (Premier) | Laptops | 18 | 1000 | 200 | ... |
| | | | | | Printer | 3 | 300 | 10 | |
| 1234 | Open | 12/12/98 | $10,11200 | ABCD (Premier) | Drill | 10,000 | 1.12 | 200 | ... |
| | | | | | Rig | 1 | 10,000,000 | 1,000,000 | |

FIG.6

End of Quarter Outstanding Loans

| Account Name | Account Rep | Loan Type | Originatio Date | Original Loan | Principle |
|---|---|---|---|---|---|
| ABCD | Bill Smith | Mortgage | 1/10/2001 | $ 125,000,000 | $ 91,250,000 |
| ABCD | Bob Shannon | Line of Credit | 7/22/2001 | $ 50,000,000 | $ 35,500,000 |
| ABCD | Bob Shannon | Development | 8/16/2000 | $ 570,000,000 | $ 416,100,000 |
| ABCD | Bob Shannon | Construction | 12/15/2000 | $ 250,000,000 | $ 182,500,000 |
| ABCD | Bob Shannon | Mortgage | 3/1/2000 | $ 120,000,000 | $ 87,600,000 |
| ABCD | Bob Shannon | Line of Credit | 3/31/2000 | $ 35,000,000 | $ 25,550,000 |
| ABCD | Bob Shannon | Construction | 4/28/2000 | $ 150,000,000 | $ 109,500,000 |
| | | | Total | $1,300,000,000 | $ 949,000,000 |

FIG.7

Customer Object Attributes

| Table | Column | Display Name | Searchable | Summary | Display | RelType | Rel Object |
|---|---|---|---|---|---|---|---|
| Customers | CustName | Company | Y | Y | Y | | |
| Customers | CustType | Type | N | N | Y | | |
| Customers | SalespersonID | Account Manager | | | | Ref | SalesPerson |
| Customers | Address | Street Address | Y | Y | Y | | |
| Customers | City | City | Y | N | Y | | |
| Customers | State | State | Y | Y | Y | | |
| Customers | Country | Country | Y | Y | Y | | |
| Customers | | Orders | N | N | Y | List | Orders |
| Contacts | CName | Contact | Y | N | Y | | |
| Contacts | Title | Title | Y | N | Y | | |
| Contacts | Phone | Telephone | Y | N | Y | | |
| Contacts | Email | Email | Y | N | Y | | |
| ... | ... | ... | ... | ... | ... | ... | ... |

FIG.8

Summary Object

| Customer | Company | Street Address | State | Country | Contact | Account Manager | Reports |
|---|---|---|---|---|---|---|---|
| ABCD (Premier) | ABCD | 123 ABC Street | TX | USA | Andy Fastow | Franz Meyer | Profitability Risk Analysis |

902

Full Object

| Company | Type | Street Address | City | State | Country | Account Manager | Related Lists | | | | | Reports and Analytics |
|---|---|---|---|---|---|---|---|---|---|---|---|---|
| ABCD | Premier | 123 ABC Street | Houston | TX | USA | Franz Meyer | Orders | | | | | Profitability Risk Analysis |

| Contacts | | | |
|---|---|---|---|
| Contact | Title | Telephone | Email |
| Andrew Faustow | CFO | 999-111-1234 | af@abcd.com |
| Kerry Blue | GM, Gas | 212-345-5678 | hotgas@abcd.com |

SEARCHING AND DISPLAYING DATA OBJECTS RESIDING IN DATA MANAGEMENT SYSTEMS

CROSS-REFERENCE TO RELATED APPLICATIONS

This application is a continuation of U.S. patent application Ser. No. 13/029,454, entitled "Searching and Displaying Data Objects Residing in Data Management Systems" and filed Feb. 17, 2011, the disclosure of which is incorporated herein by reference in its entirety.

BACKGROUND

1. Technical Field

The present invention relates to searching, displaying and navigating of data objects within data management systems.

2. Discussion of the Related Art

Searching data is known and primarily limited to unstructured data including web pages, email and documents. Traditional search engines such as Google search are used to search documents and pages for specific key strings. When a document or web page contains a particular string, it is returned as part of search results.

Many forms of valuable data are stored as structured data in data management systems, such as relational database management systems. In particular, relational database management systems include data stored in tables, where database records are ordered in rows of the tables. Database schemas are provided by the database management systems to describe the organization of data and information within the databases. For example, in relational database management systems, database schemas are provided to describe the organization of data and information in tables, columns and fields within tables, indexes for the tables as well as relationships between the tables, columns and indexes.

Some search engines are capable of searching relational database management systems. Such search engines typically treat each row of data obtained from the search as a complete search object and return the entire row in the search results. This requires the searcher to have to relate each row with the rest of the data in the database to obtain usable results from the search query.

BRIEF SUMMARY

Accordingly, embodiments of the present invention include a method, a computer program product and a system for computer-implemented method for accessing a data source to provide information. The embodiments comprise defining a plurality of data objects each associated with data within the data source, where the data objects include search information that facilitates searching of the data objects, and the data objects further include display information that pertains to a format in which data obtained from a search of the data objects is displayed, defining one or more relationships linking at least one data object with at least one other data object so as to establish associated data objects with linking relationships, receiving a query to search for data within the data source, retrieving data within the data source satisfying the query in accordance with the search information, where the retrieved data comprises data from at least two associated data objects, organizing and displaying the retrieved data in accordance with the display information, and displaying one or more links associated with the retrieved data so as to enable navigation between associated data objects.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIGS. 4-7 are views of a graphical user interface that displays search results of an enterprise in accordance with another embodiment of the present invention.

FIG. 8 is an attribute table in accordance with an embodiment of the present invention for a data object associated with the enterprise displayed in the graphical user interface depicted by FIGS. 4-7.

FIG. 9 provides further views of a graphical user interface in which data is displayed based upon the configuration settings of the attribute table of FIG. 8 in accordance with an embodiment of the present invention.

DETAILED DESCRIPTION

In accordance with embodiments of the present invention, a method, system and computer program product are provided which facilitate searching and retrieval of single or multiple data sources or databases and obtaining results that are organized in a manner that is suitable for identification of relationships between data in the results. In particular, searching of single or multiple data sources or databases can be achieved utilizing previously defined data objects, where the data objects exist as a cluster of related tables in one or more database management systems. Instead of searching individual records and providing search results as flat, scattered fragments of records, the data in all tables in a data object is searched and the search results are configured as instances of data objects that are connected through hyperlinks. In other words, instances of data objects are displayed with links to associated instances of data objects so as to enable navigation between two or more associated data objects.

Any suitable system and method can be utilized to facilitate retrieval of data from one or more databases. Example embodiments of systems and corresponding methods for determining relationships and mappings between data in different databases and for facilitating retrieval of data from databases based upon a search query are described in U.S. Pat. Nos. 7,426,520 and 7,680,828, both of which are incorporated herein by reference in their entireties. However, it is noted that the present invention is not limited to these example embodiments but instead can utilize any suitable systems and methods that facilitate retrieval of relevant data from one or more data sources, where the features of the present invention provide for presentation of the data in a manner such that instances of data are linked with associated instances of data by hyperlinks (thus allowing for a quick and easy navigation of the data in the search result in order to provide more useful information to the user searching for the information from the one or more databases).

Figure 1:
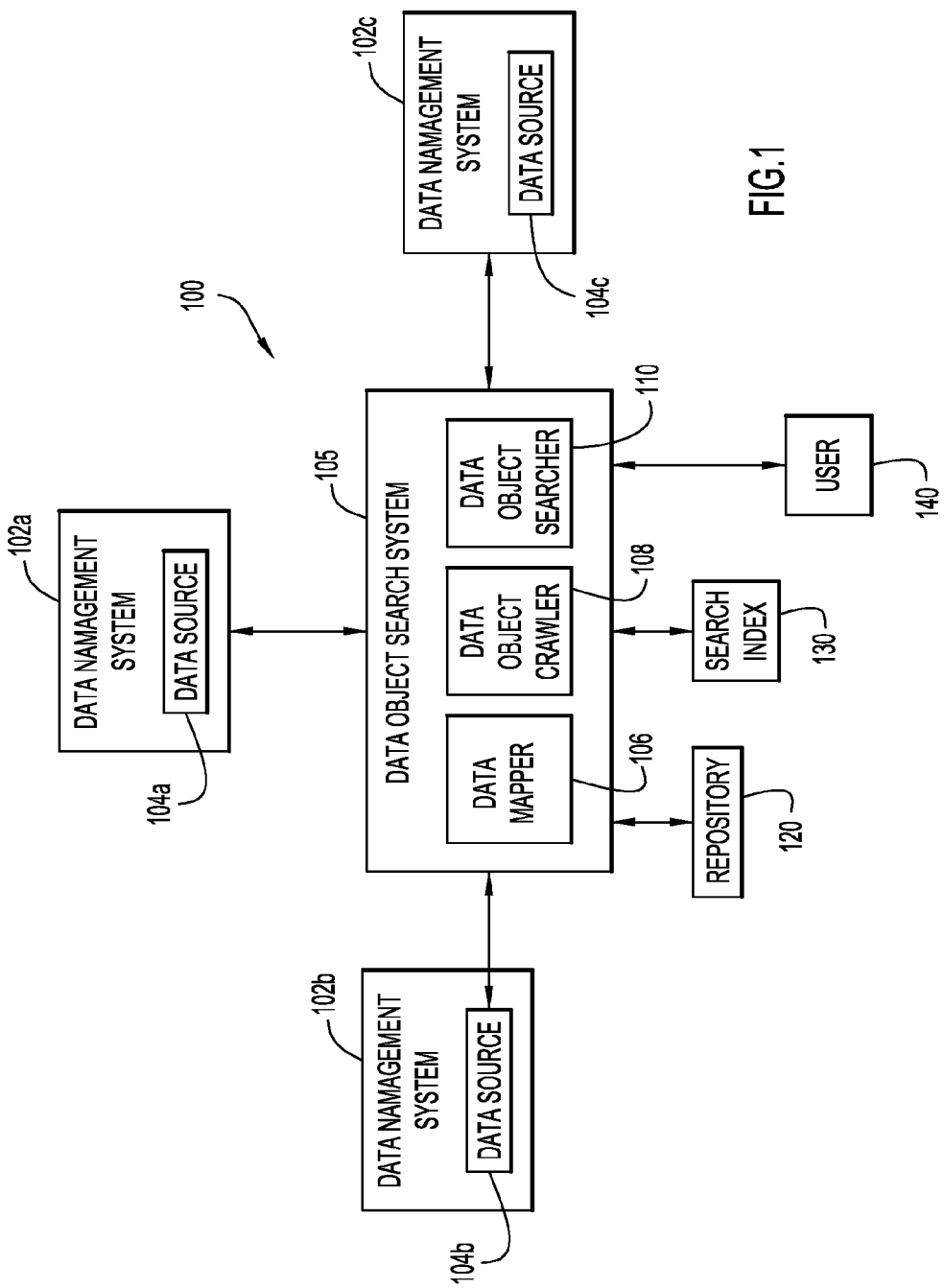
FIG. 1 is a block diagram illustrating an example embodiment of an enterprise including a data mapper for searching and displaying of data objects within data management systems in accordance with the present invention.

An example embodiment of a system for facilitating data retrieval from a plurality of databases or data sources is shown in FIG. 1. In particular, the system or enterprise 100 includes data management systems 102a-c, data sources 104a-c, and a data object search system 105 coupled with each of the data management systems. The data object search system 105 comprises a data mapper 106, a data object crawler 108 and a data object searcher 110. It is noted that the data mapper 106, data object crawler 108 and data object searcher 110 can be formed as a single component or, alternatively, as any two or more separate components defining the data object search system 105.

Data management systems 102a-c and data sources 104a-c are hereinafter referred to as data management systems 102 and data sources 104, respectively. System 100 can be any type of enterprise including, without limitation, a commercial enterprise, educational enterprise, or financial enterprise. Data management systems 102 can be any suitable types including, without limitation, accounting data management systems, Customer data management systems, Account data management systems, Employee data management systems, etc.

Data management systems 102 include data sources 104. For example, with reference to FIG. 1, data management system 102a includes data source 104a, data management system 102b includes data source 104b, and data management system 102c includes data source 104c. Data sources 104 may be operational data sources, data-warehouse data sources or federated data sources. An operational data source is used in an operational data management system. An operational data management system accepts queries from a user, identifies the information on the basis of the queries, and returns the results to the user. The operational data management system also accepts updates from the user, and accordingly, updates data in the operational data source. Examples of operational data management systems include, without limitation, On Line Transaction Processing (OLTP) data management systems, custom-billing data management systems, and Management Information Systems (MISs). A data-warehouse data source is a data repository, which integrates data from various data management systems. Examples of data-warehouse data sources include, without limitation, data marts and enterprise data warehouses. A federated data source is used to make multiple operational and/or data-warehouse data sources appear as a single integrated data source. It is to be understood that the specific designation of data sources 104 and data management systems 102 in FIG. 1 is for purposes of example, and the present invention is not limited to the specific design of the enterprise 100. For example, while the embodiment of FIG. 1 shows each data management system 102 with a single data source 104, it is noted that each data management system can include two or data sources.

Each data source 104 can include data in the same format or, alternatively, in a different or proprietary format. For example, data in data management system 102a may be in Data Base 2 (DB2) format, while data in data management system 102b may be in Oracle format. The data in the data management systems are integrated with each other in order to facilitate searching across two or more data management systems.

The process of integration and organization of data between the different data management systems is performed by the data mapper 106. The data mapper 106 determines the relation between data stored in one or more data sources 104 and then maps data. For example, the data mapper 106 is capable of mapping data from a source data management system to a target data management system. The data object search system 105, which includes the data mapper 106, is coupled in any suitable manner to each data management system 102 so as to facilitate access of data from each data management system by the data mapper 106. In addition, the data mapper 106 allows a user to select a plurality of data sources from data sources 104, and then map data sources 104 in any combination. For example, a user may select data source 104a in data management system 102a as the source data source and data sources 104d and 104e in target data management system 102d as the target data sources.

Data in a data source can be stored in various data tables to form data objects. The data mapper 106 determines the relationships between the data tables in the data objects by identifying primary keys and foreign keys in the data tables. The data tables and their relationships may be illustrated in the form of relationship graphs. A primary key is a set of attributes that uniquely identifies an entity, which is a certain unit of data that can be classified and has stated relationships to other entities. For example, a data object providing information about customers can be generated including each customer as an entity, in which attributes of each customer include columns from one or more data tables with instances of data disposed in the columns. Each entity includes one or more instances of data from the data tables. The primary key is unique, stable, and non-zero under all conditions. A foreign key of an entity in a data table provides referential information about the entity. The foreign key provides the relation between the entity in the data table and entities in other data tables. Further, a foreign key of one of the data tables can be a primary key of another data table.

The data mapper 106 identifies the relationships between the data tables in a single data object or in two or more data objects on the basis of the identified primary and foreign keys. Data-table relationships can be classified into different types of relationships including, without limitation, an attribute relationship, a reference relationship, and a cross-reference relationship. An example of identification and mapping of relationships between the data tables by data mapper 106 is described in detail in U.S. Pat. Nos. 7,426,520 and 7,680,828.

In an attribute relationship, a parent table describes an entity, and a child table includes additional information about the entity. The parent table is a data table that links various child tables. The child tables and the parent table include at least one common column. The child tables will typically further include additional columns, in certain embodiments of the invention. In a reference relationship, a child table describes an entity, and the parent table includes reference information about the entity. In a cross-reference relationship between two entity tables, the two entity tables provide reference information about an entity. An entity table is a data table, wherein the primary key of the data table does not include any foreign key of other data tables.

The data mapper 106 identifies the data tables on the basis of the identified primary and foreign keys, and the identified relationships between the data tables.

Data tables in an operational data source can be classified into operational system tables, cross-reference tables, attribute tables, and entity tables. An operational system table is a data table that stores metadata of data tables of the operational data source. A cross-reference table is a data table, where the primary key of the data table includes foreign keys from other data tables. An attribute table is a data table, where a part of the primary key of the data table includes a foreign key of another data table.

Data tables in a data-warehouse data source can be classified into data-warehouse system tables, fact tables, dimension tables, reference tables, and attribute tables. A data-warehouse system table is a data table that stores metadata of data tables of the data-warehouse data source.

A federated data source includes multiple operational and/or data-warehouse data sources. Therefore, the federated data source may be either an operational data source or a data-warehouse data source.

The data mapper 106 generates a Local Data Object (LDO) on the basis of the identified data-table relationships and data-table types. The LDO provides a logical representation of the relationships between the data tables in the data source. However, it is noted that a data source can have multiple LDOs. It is also noted that an LDO can correspond to only some data tables in the data source instead of all the data tables. For example, a data source can have three data tables, Customers, Addresses, and Orders. However, an LDO of the data source, CustomerLDO, may correspond to only two of the data tables, Customers and Addresses, while another LDO, OrdersLDO, also corresponds to only two of the data tables, Customers and Orders. Therefore, CustomerLDO provides the logical representation of the relationships between data related to customers, while OrderLDO provides the logical representation of the relationships between data related to orders.

The LDO has a root table that includes the natural key of an entity in the LDO. The natural key is a subset of attributes of the entity, which uniquely identifies the entity. The root table does not have any parent table. All other tables represented in the LDO are child tables related to the root table. The LDO includes parent-child relationship expressions of the data tables. The parent-child relationship expressions may be based on the primary-foreign key relationships between the data tables, for example, in case of a Relational Database Management System (RDBMS).

The data mapper 106 generates LDOs for all data sources 104. One data source can have a single LDO or several LDOs. In addition, a particular data table can be represented in more than one LDO. Examples of LDOs are depicted in U.S. Pat. No. 7,680,828.

Data mapper 106 also generates a Global Data Object (GDO). The GDO is a data object that corresponds to an entity. The GDO is a data model that consolidates a plurality of LDOs into a single integrated model. The GDO includes the relationships between the plurality of LDOs. Therefore, the plurality of LDOs are mapped onto the GDO. Example embodiment of generating a GDO and LDOs that are mapped to a GDO are described in U.S. Pat. Nos. 7,426,520 and 7,680,828.

The GDOs facilitate data retrieval from data sources 104 of data management systems 102. When a search query is requested, the GDO corresponding to the data associated with the search query is referenced, and that GDO provides the information on how to retrieve the required data.

Thus, data objects from data sources of one or more data management systems are mapped together (e.g., by forming LDOs and GDOs as described above), and a search query by a user for results in data provided by the mapper, including entities that are related from two or more data sources. The data mapper 106 stores data objects and definitions (including LDOs, GDOs, primary and foreign keys and related information) within a repository 120 that is also accessible by the data object crawler 108 and data object searcher 110.

As noted above, search results from data management systems, in particular, relational database management systems, are typically provided by retrieving rows of data from data objects. While such search results are relevant, they are not in an organized manner that allows a user to easily navigate from one instance of data to another, related instance of data.

In an example embodiment of the invention, primary and foreign keys of the tables in the data objects retrieved from a search query are utilized to provide a linking between related instances of data that may be in different tables or different data objects. In particular, the retrieved data is displayed in a format that utilizes primary keys and foreign keys between tables to establish hyperlinks in the displayed data, and these hyperlinks facilitate easy navigation by the user between related instances of data in the search results.

Figure 2:
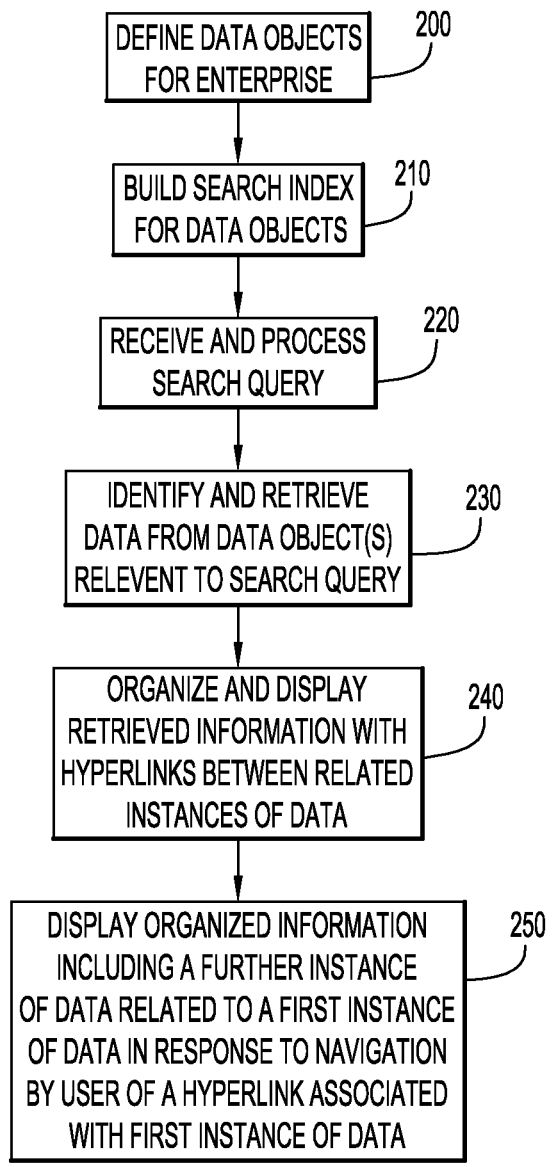
FIG. 2 provides a flowchart depicting an example method of according to an embodiment of the present invention.

The flowchart of FIG. 2 provides an example method of searching data objects in an enterprise comprising one or more data management systems such as the enterprise 100 of FIG. 1. In particular, data objects, which comprise data tables in one or more of the data sources of the enterprise, are initially defined or established (step 200). The data objects are defined and linked or mapped to each other, for example, using the data mapper 106 and the methods described above. As noted above, the data objects comprise tables of data from one or more data sources, and the primary keys and foreign keys associated with the data tables and data objects provide links between associated or related data objects and associated or related instances of data for one or more data objects. The data mapping also determines how queried information is to be displayed for associated data objects. As described below, the user can also specify which data object attributes are searched and which are to be displayed as part of search results. The data objects, primary and foreign keys and related definitions and information regarding the data objects is stored by the data mapper 106 in the repository 120.

After data objects have been defined, the data object crawler 108 browses or crawls the data objects and related information in the repository 120 in order to build a search index 130 (step 210). The search index 130 can be designed in any suitable manner to facilitate efficient processing of a search query by searching the search index to find data within the data objects that is related to the search query. For example, the search index 130 can be built in a similar manner in which a search engine (e.g., www.google.com) crawls the world wide web to generate a search index that is searched to obtain search results based upon a search query. The data object crawler 108 crawls the data objects and related information stored in the repository 120 to generate an index in which data objects are associated with values of the fields in the data object, such that a search on a search string will return the identities of the data object instances that contain values that match the search string. The identities may be expressed in any number of ways, including data object type and primary key value, special generated identifier assigned to each data object instance by the search crawler or any number of other ways. For example, if an instance of a Customer Data Object for a company Google has an attribute state that contains a value 'California', a search on 'California' in the search index will return the identity of Customer Data Object instance for Google. The data for the Data Object instance that the search index would point to would contain all the information required to display the fields in the Data Object as well as create the hyperlinks that relate this Data Object instance to other data objects via the primary and foreign keys associated with those data objects. This data may be stored as an XML document or some other file format, it can be stored in a relational database or can be retrieved at run time from the source systems. Many methods of caching and retrieving data exist and can be utilized. In an example method, only the data necessary to present search results is stored in the local index or cache and the rest of the data is retrieved at run-time from the source system. Alternatively, it is noted that the data object search system 105 can process a search query by searching the data objects and related information in the repository 120 directly instead of using a search index 130.

A search query from a user (the user is represented by box 140 in FIG. 1) is received and processed by the data object search system 105 (step 220). In particular, the data object searcher 110 of the data object search system 105 receives and processes the search query from the user 140, where the data object searcher 110 utilizes the search index 130 and repository 120 to identify and retrieve information comprising instances of data from one or more data objects that satisfy and are relevant to the search query (step 230). The retrieved information is organized and displayed in accordance with how information for associated data objects is to be displayed (step 240). In particular, the displayed information includes instances of data objects which are hyperlinked to other related instances of data objects. When a user navigates a particular hyperlink in the display associated with a first instance of data, the data object searcher 110 provides a further display of organized information including a second or further instance of data that is related (via primary or foreign key) to the previous or first instance of data (step 250).

Thus, each data object is searched by the data object searcher in response to a search query by a user, including all (or selected) tables and all (or selected) attributes making up each data object. When a suitable match between an instance of data in a table column of a data object and the search query is obtained, the search result does not simply return the row of the table including this matching instance of data but instead returns the matching instance of data as well as other instances of data from the data object that have been designated for display, including instances of data associated with other rows of the same data table and/or instances of data associated with other data tables of the data object.

Example scenarios showing how search queries of data objects from one or more data sources are displayed, including links between related instances of data, are now described.

Figure 3:
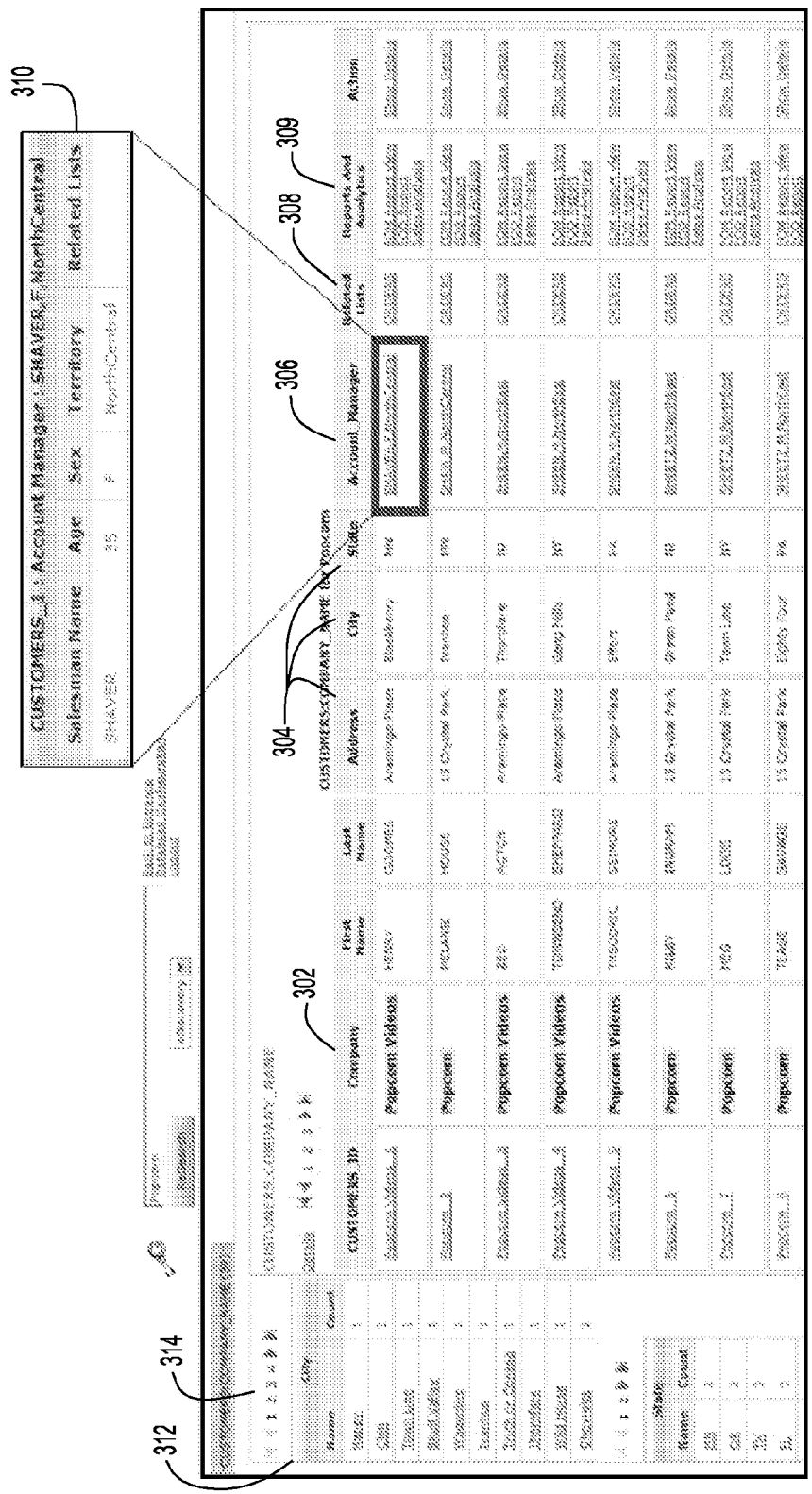
FIG. 3 is a view of a graphical user interface that displays search results of an enterprise in accordance with an embodiment of the present invention.

Referring to FIG. 3, a graphical user interface is depicted showing a table of search results for a commercial enterprise in which customers, customer orders, reports and other instances of data are available for display to a user based upon a search query. The data from different data sources is organized by a data mapper 106 (e.g., in the manner described above) by defining data objects and linking a number of data objects and data instances together by primary and foreign keys. In this example, a user 140 performs a search utilizing the data object search system 105, where the user provides a search query for customer information having the term "popcorn" in the customer name. The data object search system 105 identifies, via the defined data objects, instances of data that are relevant to the search criteria and provides the data in the display shown in FIG. 3. In particular, the displayed search results are in a table including customers having the term "popcorn" in the customer name (as shown in the Company column 302), along with other information such as customer address (shown in Address, City and State columns 304), account manager for each customer (shown in Account_Manager column 306), orders and reports that can be provided for each customer. Defined data objects can be, for example, a Customer data object, Account Manager Data object, Orders data object, etc.

Certain columns of data provide hyperlinks to related data via primary and foreign keys of the data objects. For example, a hyperlink is provided to an Account Manager data object based upon primary-foreign key relationships between the Account Manager data object and the Customer data object. The window 310 shown in FIG. 3 shows an example of an instance of Account Manager data for the company Popcorn Videos that can be easily navigated via the hyperlink to Account Manager information from the displayed table of information, where the hyperlink is based upon primary-foreign key relationships between the Customer data object and the Account Manager data object. In addition, hyperlinks are provided in the Related Lists column 308 to allow the user to navigate to lists of orders associated with the particular customer via primary-foreign key relationships between the Customer data object and the Orders data object.

Other types of related information may be made available and associated with search results through parameterized calling strings (such as a HTTP string or a command line string) that pass information about a particular data object to the reporting system. For example, the Reports and Analytics column 309 can be configured to provide reports with selected types of information (e.g., end-of-month reports, end-of-quarter reports, and other types of sales analysis reports) by hyperlinking to a reporting system and passing necessary information (such as customer identifier) as part of the hyperlink. The reporting and analytics column associates a particular report (e.g., end-of-month report) with a particular attribute (e.g., customer name attribute) for a data object (e.g., Customers data object) by providing a hyperlink associated with that particular data object which will link with the report for that data object attribute.

In the example shown in FIG. 3, an end-of-month report could be hyperlinked to a particular customer utilizing a link such as "http://reports.myreportingsystem.com?custname=<customer name>", where "<customer name>" is the name of the customer for the particular customer attribute associated with the report. The correct report can be associated with the corresponding attribute of the Customer data object by creating a template hyperlink "http://reports.myreportingsystem.com?custname=<$Company>" and associating it with Customer data object. When the search results are returned, the hyperlink will get filled in with the value of Company attribute for each returned instance of the data object. For example, the "EOM Report View" hyperlink would be set to http://reports.myreportingsystem.com?custname=Popcorn Videos 1 for the first row, to http://reports.myreportingsystem.com?custname=Popcorn 2 for the second row, etc.

The displayed information shown in FIG. 3 can also include a window 312 that filters the search results based upon city and state, where a hyperlink for a specific city will show only the customers in that city. The graphical user interface of FIG. 3 also provides the feature of displaying the search results on multiple pages, with the option of navigating to a specific page of search results (as shown in the box 314).

The data can be organized and provided by the data object searcher 110 in any suitable manner, with any suitable number and types of hyperlinks to related data based upon primary-foreign key relationships between defined data objects, where the amount and types of data provided are based upon any number of factors including, without limitation, the search criteria, the number of relationships defined between instances of data and data objects, and the security level of the user (e.g., the user may have limited or restricted access to certain types of data) and/or types of data typically accessible by a user. A user can further design or customize the types of data for display, as described in further detail below.

In another example scenario that includes a graphical user interface as depicted in FIGS. 4-7, an investment banking enterprise includes a plurality of data management systems with data sources and a data object search system to map data and to and facilitate a search, navigation and display of search results, where the system is similar to that described above and depicted in FIG. 1. The data is defined in tables of a plurality of data objects stored in a plurality of data sources of the data management systems. As shown FIG. 4, the data objects include a plurality of data objects that have been defined by a data mapper of the data object search system, including a Customers data object 402, a Loans data object 404, and a Purchase Orders data object 406. The information shown in the display of FIG. 4 is the result of a search of the enterprise for a search string 'ABCD', which returns all information relating to ABCD Company. In particular, the instances of data in the search results for the Customers data object 402 comprise different office/branch/division locations for ABCD Company, with corresponding address information, contact information, the account manager associated with the particular office location, and report information that is accessible for each office location. The instances of data in the search results for the Loans data object 404 comprise specific loans (identified by loan number) for ABCD Company office locations along with other information, including loan origination date, remaining principal and report information that is accessible for each loan. The Purchase Orders data object lists information associated with purchase orders associated with ABCD Company. Each of the data objects includes instances of data which include hyperlinks to other related instances of data, where the instances of data are related by primary and/or foreign keys.

Figure 5:
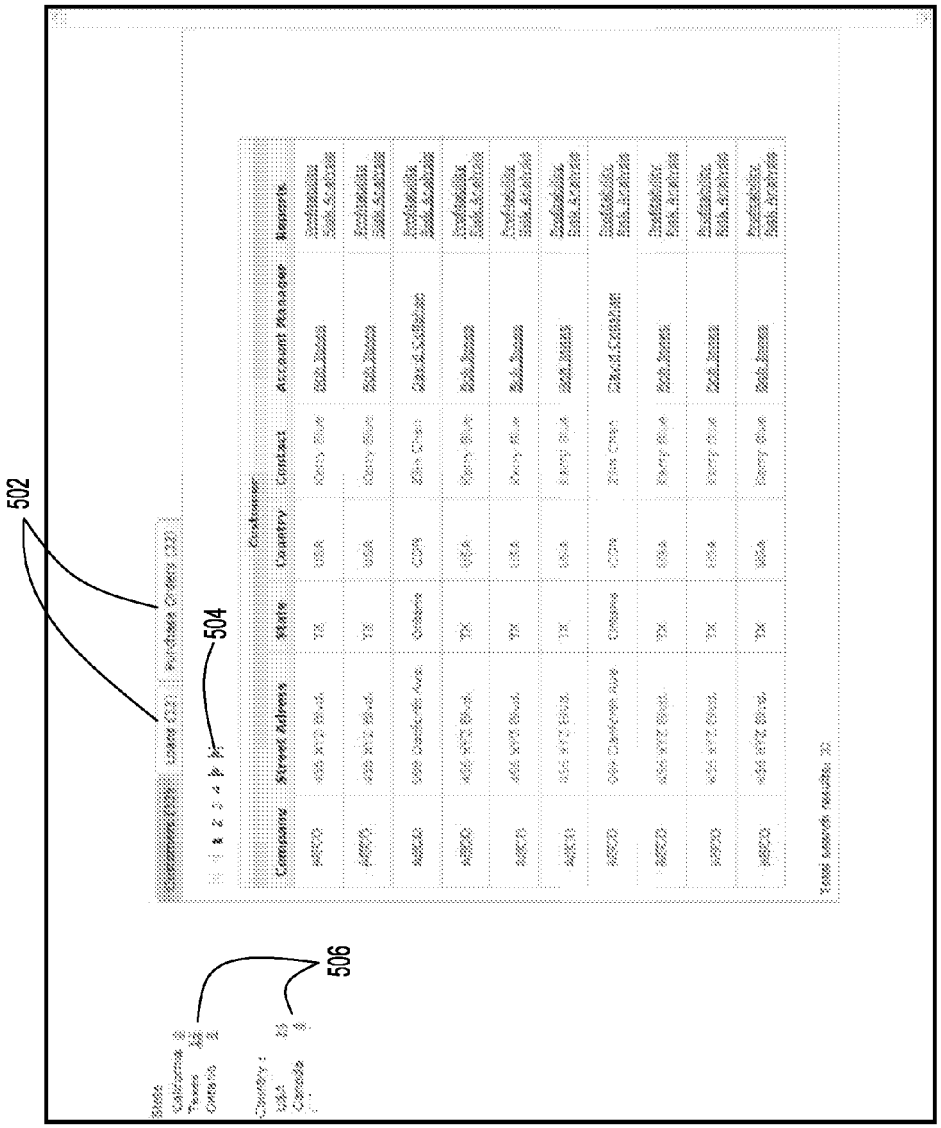

For example, FIG. 5 depicts a graphical user interface of the Customers data object for the search results for ABCD in the enterprise, further allowing the user to navigate to the Loans data object or the Purchase Order data object (via boxes 502). The display in FIG. 5 further shows the number of search results for ABCD associated with each data object (e.g., 32 ABCD company locations for the Customer data object, 22 loans associated with ABCD Company for the Loan data object, and 22 purchase orders associated with ABCD Company for the Purchase Order data object as shown in the boxes 502). As with the previous example, the graphical user interface of FIG. 5 also provides the feature of displaying the search results on multiple pages, with the option of navigating to a specific page of search results (as shown in the box 504). In addition, the displayed information can organize the search results based upon city and state, where hyperlinks can be navigated so as to easily find information about ABCD Company in a specific city or state (see hyperlinks located at reference number 506). Information about the Account Manager, profitability and risk analysis reports are also accessible via hyperlinks for each ABCD Company location listed in the search results. When a hyperlink is navigated by the user for a particular instance of data, information that is linked with that instance of data by report parameters is presented in accordance with a predefined information format.

The graphical user interface can also present data from the search results as shown in FIG. 6, in response to a user navigating by hyperlink a particular instance of data within the Company column of the search results for the Customers data object 402 depicted in FIG. 4. The displayed information comprises a table 602 with information for the ABCD Company location that is similar to that shown in the Customers data object 402 but also with further information including data instances with further hyperlinks to related data instances (where the data instances are linked by primary/foreign keys of the data objects). One hyperlink is shown for the Related Lists column as table 604, in which information about orders associated with the ABCD Company location listed in table 602 is displayed, including further hyperlinks to instances of data associated with some of the displayed instances of data.

An example of navigating an instance of data in the Reports column for Customers data object 402 is depicted in FIG. 7. In particular, navigation of the EOQ Loan instance of data provides a link to a table 702 of End of Quarter Outstanding Loans for this particular ABCD Company location, where the report is provided by a reporting system having information about each company (or a selected number of companies) for the Customers data object.

The data object search system further allows a user to design or customize the types of data for display. In particular, the configuration settings for a particular data object can be established based upon an attribute table such as is shown in FIG. 8. This table, which can be stored in the repository 120 (or any other suitable location of the data object search system) provides information regarding columns of data tables that define the data object and that can be searched and displayed (e.g., in a summary display or a full display) and also showing relationships with other, related data objects. The attributes for the Customer data object are shown in FIG. 8, in which a Customers table and a Contacts table (which can be from one or more data sources from one or more data management systems) are combined, include information regarding which attributes are displayed in both a summary object display (under the "Summary" column) or a full object display (under the "Display" column), where "Y" indicates yes and "N" indicates no. This table further indicates which attributes are searchable (under the "Searchable" column), as well as whether there are any relational data objects for a particular attribute (under the "Rel Object" column) as well as the relational type (under the "RelType" column). For example, the CustName attribute in the Customers table (which is displayed as "Company") is searchable by the data object searcher of the data object search system and is displayed in both a summary object display as well as a full object display. FIG. 9 shows the data that is displayed for a search query for information relating to ABCD Company in both the Summary Object form (table 902) and the Full Object form (table 904) based upon the attribute information shown for the Customer data object in the table of FIG. 8.

The SalespersonID attribute (displayed as "Account Manager") has a reference to a related object (SalesPerson), such that the instance of data in the displayed Account Manager column includes a hyperlink (via primary/foreign keys associated with each data object) to a related instance of data that provides information about that Account Manager. An attribute table for the SalesPerson data object can also be provided, with similar configuration settings to facilitate searching and/or display of certain attributes as well as providing information showing relationships between related objects (which can be linked by primary/foreign keys for the related data objects). In addition, the Orders attribute is related to the Customers table as a list type relationship and provides a hyperlink (via primary/foreign keys associated with each data object) to the Orders data object so as to provide a list of orders corresponding to the associated Company.

The attribute table shown in FIG. 8 could be predefined and set prior to searching by a user. Alternatively, the data object search system can be configured to permit an attribute table to be manipulated by a user, for example, by allowing the user to change settings such as which attributes would be displayed and/or which would be searchable. In response to a search query, the data object searcher searches all (or a selected number of) tables and selected attributes (could be some or all for each table) of a particular data object based upon the configuration settings set forth in the attribute table for this data object. Optionally, the configuration settings can be selectively adjusted to control which tables and/or which attributes of a data object are searched by the data object search system.

Thus, the present invention facilitates the linking of data relationships in search results of data management systems including structured data, such as relational database management systems, by hyperlinks so as to permit easy navigation by a user from one instance of data to another, related instance of data. The data object search system further facilitates control of how the data objects are searched (by setting and/or selectively adjusting attributes and/or tables to be searched in the data objects) and/or how search results are displayed (by setting and/or selectively adjusting which attributes from which tables are to be displayed for certain display settings).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The data management systems, data sources and data object search system (including data mapper, data object crawler and data object searcher) can be any suitable computer systems implemented by any type of hardware and/or other processing circuitry, and utilizing any suitable hardware and software implemented in a single module or unit or, alternatively, implemented as two or more separate units. In particular, the data management systems, data sources and data object search system (including data mapper, data object crawler and data object searcher) may be implemented by any quantity of conventional or other suitable types of computer systems or devices (e.g., computer terminals, personal computers (e.g., tablet, laptop, etc.), etc.), server computers, cellular telephones, personal data assistants (e.g., Palm Pre, Droid, iPhone, etc.), etc., and may include any commercially available operating system and any commercially available or custom software (e.g., browser software, communications software, word processing software, database management systems (e.g., DB2, Oracle, etc.), files in various formats (e.g., Comma Value Delimited (CSV), XML, VSAM, etc.), search engines (e.g., OmniFind, Google, etc.). These systems may include types of displays and input devices (e.g., keyboard, mouse, voice recognition, etc.) to enter and/or view information.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Features of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of accessing a data source to provide information comprising:
    defining a plurality of data objects each associated with data within the data source, wherein the data objects include search information that facilitates searching of the data objects, and the data objects further include display information that pertains to a format in which data obtained from a search of the data objects is displayed;
    defining one or more relationships linking at least one data object with at least one other data object so as to establish associated data objects with linking relationships;
    receiving a single query to search for data within the data source;
    retrieving data within the data source satisfying the single query in accordance with the search information, wherein the retrieved data comprises data from at least two associated data objects;
    organizing and displaying the retrieved data in accordance with the display information; and
    displaying one or more links associated with the retrieved data so as to enable navigation between associated data objects;
    wherein the single query results in the retrieved data, such that the organizing and displaying of the retrieved data and one or more links associated with the retrieved data enables navigation between associated data objects based upon the single query.

2. The method of claim 1, further comprising:
    navigating from a first display of retrieved data to a second display of retrieved data by selecting a link between two associated data objects, wherein the data objects include primary and foreign keys that are used to define linking relationships for associated data objects, the first display of retrieved data comprises a first instance of data, and the second display of retrieved data comprises a second instance of data that is related to the first instance of data via a primary key or a foreign key of a data object that includes the first instance of data.

3. The method of claim 1, further comprising:
    generating a search index associated with the one or more defined data objects;
    wherein the retrieving of data within the data source satisfying the single query comprises searching the search index.

4. The method of claim 1, wherein the retrieving of data within the data source satisfying the single query comprises searching a selected set of attributes in each defined data object, and the selected set of attributes are located within a plurality of data tables of the defined data object.

5. The method of claim 1, wherein the organization and display of the retrieved data comprises displaying at least one row of data comprising instances of data that are in different data tables of a defined data object.

6. The method of claim 1, wherein the displaying of one or more links associated with the retrieved data further comprises linking, via a parameterized calling string, at least one instance of data with a report providing further data related to the instance of data.

7. A computer program product for accessing a data source to provide information, the computer program product comprising:
    a computer readable storage medium having computer readable program code embodied therewith, the computer readable program code configured to:
        define a plurality of data objects each associated with data within the data source and including search information that facilitates searching of the data objects, and the data objects further including display information that pertains to a format in which data obtained from a search of the data objects is displayed;
        define one or more relationships linking at least one data object with at least one other data object so as to establish associated data objects with linking relationships;
        receive a single query to search for data within the data source;
        retrieve data within the data source satisfying the single query in accordance with the search information, wherein the retrieved data comprises data from at least two associated data objects;

organize and display the retrieved data in accordance with the display information; and display one or more links associated with the retrieved data so as to enable navigation between associated data objects;

wherein the single query results in the retrieved data, such that the organizing and displaying of the retrieved data and one or more links associated with the retrieved data enables navigation between associated data objects based upon the single query.

8. The computer program product of claim 7, wherein the computer readable program code is further configured to:

navigate from a first display of retrieved data to a second display of retrieved data by selecting a link between two associated data objects, wherein the data objects include primary and foreign keys that are used to define linking relationships for associated data objects, the first display of retrieved data comprises a first instance of data, and the second display of retrieved data comprises a second instance of data that is related to the first instance of data via a primary key or a foreign key of a data object that includes the first instance of data.

9. The computer program product of claim 7, wherein the computer readable program code is further configured to:

generate a search index associated with the one or more defined data objects;

wherein the retrieving of data within the data source satisfying the single query comprises searching the search index.

10. The computer program product of claim 7, wherein the retrieving of data within the data source satisfying the single query by the computer readable program code comprises searching a selected set of attributes in each defined data object, and the selected set of attributes are located within a plurality of data tables of the defined data object.

11. The computer program product of claim 7, wherein the organization and display of the retrieved data by the computer readable program code comprises displaying at least one row of data comprising instances of data that are in different data tables of a defined data object.

12. The computer program product of claim 7, wherein the display of one or more links associated with the retrieved data by the computer readable program code further comprises linking, via a parameterized calling string, at least one instance of data with a report providing further data related to the instance of data.

13. A system for accessing a data source to provide information, the system comprising:

at least one data management system comprising a data source configured to store data; and a data object search system coupled with the at least one data management system, the data object search system configured to:

define a plurality of data objects each associated with data within the data source and including search information that facilitates searching of the data objects, and the data objects further including display information that pertains to a format in which data obtained from a search of the data objects is displayed;

define one or more relationships linking at least one data object with at least one other data object so as to establish associated data objects with linking relationships;

receive a single query to search for data within the data source;

retrieve data within the data source satisfying the single query in accordance with the search information, wherein the retrieved data comprises data from at least two associated data objects;

organize and display the retrieved data in accordance with the display information; and display one or more links associated with the retrieved data so as to enable navigation between associated data objects;

wherein the single query results in the retrieved data, such that the organizing and displaying of the retrieved data and one or more links associated with the retrieved data enables navigation between associated data objects based upon the single query.

14. The system of claim 13, wherein the data object search system is further configured to:

navigate from a first display of retrieved data to a second display of retrieved data by selecting a link between two associated data objects, wherein the data objects include primary and foreign keys that are used to define linking relationships for associated data objects, the first display of retrieved data comprises a first instance of data, and the second display of retrieved data comprises a second instance of data that is related to the first instance of data via a primary key or a foreign key of a data object that includes the first instance of data.

15. The system of claim 13, wherein the data object search system comprises a data mapper that defines data objects within the data source and establishes associated data objects and a data object searcher that receives the single query, retrieves data within the data source that satisfies the single query and organizes and displays the retrieved data.

16. The system of claim 15, wherein the data object search system further comprises a data object crawler configured to generate a search index associated with the one or more defined data objects, and the data object searcher retrieves data within the data source satisfying the single query by searching the search index.

17. The system of claim 13, wherein the organization and display of the retrieved data by the data object search system comprises displaying at least one row of data comprising instances of data that are in different data tables of a defined data object.

* * * * *